United States Patent [19]

Gardikes

[11] 3,905,934

[45] Sept. 16, 1975

[54] PHENOLIC RESIN-POLYISOCYANATE BINDER SYSTEMS CONTAINING DIALKYL PHTHALATE SOLVENTS

[75] Inventor: John J. Gardikes, Worthington, Ohio

[73] Assignee: Ashland Oil, Inc., Ashland, Ky.

[22] Filed: May 23, 1974

[21] Appl. No.: 472,919

[52] U.S. Cl................. 260/31.8 T; 164/43; 260/38; 260/DIG. 40
[51] Int. Cl.$^2$........................................... C08K 5/12
[58] Field of Search.......... 260/31.8 T, DIG. 40, 38; 164/43

[56] References Cited
UNITED STATES PATENTS

| | | | |
|---|---|---|---|
| 1,695,566 | 12/1928 | Turkington..................... | 260/31.8 T |
| 2,321,766 | 6/1943 | Murdock..................... | 260/31.8 T X |
| 2,912,406 | 11/1959 | Less et al........................ | 260/31.8 T |
| 3,676,392 | 7/1972 | Robins......................... | 260/DIG. 40 |

Primary Examiner—Melvyn I. Marquis
Assistant Examiner—S. M. Person

[57] ABSTRACT

Dialkyl phthalate esters, particularly those of ortho-pthalic acid, are used as part or all of the solvent in solvent systems for two-package resin compositions comprising a phenolic resin component and a polyisocyanate hardener package and, in three-package systems for, the basic catalyst used.

26 Claims, No Drawings

PHENOLIC RESIN-POLYISOCYANATE BINDER SYSTEMS CONTAINING DIALKYL PHTHALATE SOLVENTS

NATURE OF THE INVENTION

This invention relates to binder compositions particularly to binder compositions useful in the foundry art for making cores which are hardened at room temperature. In still another aspect the present invention relates to combinations of a foundry aggregate such as sand and a binder based on phenolic resins and polyisocyanates which on being formed into a coherent mass with the aggregate is capable of being cured at room temperature, by a gaseous curing agent or an alkaline agent incorporated into the binder.

PRIOR ART

U.S. Pat. Nos. 3,409,579 and 3,676,392 disclose binder compositions made available as two-package systems comprising a resin component in one package and a hardener component in the other package. The resin component comprises an organic solvent solution of phenolic resin. The hardener component comprises a liquid polyisocyanate having at least two isocyanate groups per molecule. At the same time the contents of the two packages are combined and then mixed with the sand aggregate or preferably the packages are sequentially admixed with sand aggregate. After a uniform distribution of the binder on the sand particles has been obtained, the resulting foundry mix is molded into the desired shape. In the U.S. Pat. No. 3,409,579 the molded shape is cured by passing a gaseous tertiary amine through it. In the U.S. Pat. No. 3,676,392, curing is effected by means of a base having a $pk_b$ value in the range of about 7 to about 11 as determined by a method described by D. D. Perrin in Dissociation Constants of Organic Bases in Aqueous Solution (Butterworths, London 1965). The base is introduced originally into the resin component before it is mixed with hardener, or it may be introduced as the third component of a three-package binder system comprising in separate packages the resin component, the hardener, and the base.

In both the U.S. Pat. Nos. 3,409,579 and 3,676,392 the preferred phenolic resins are benzylic ether resins. These are the condensation products of a phenol having the general formula:

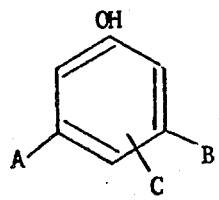

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase under substantially anhydrous conditions at temperatures below about 130°C in the presence of catalytic concentrations of a metal ion dissolved in the reaction medium. The preparation and characterization of these resins is disclosed in greater detail in U.S. Pat. No. 3,485,797.

In the preferred form, these resins have the general formula:

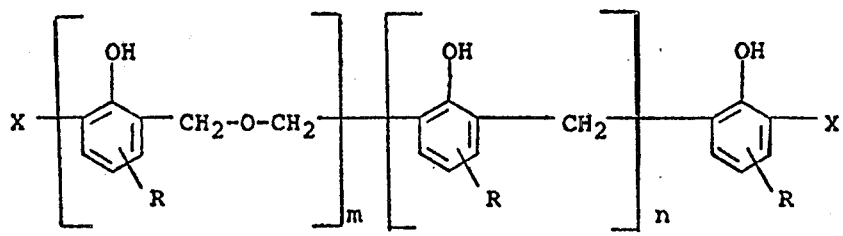

wherein R is hydrogen or a phenolic substituent, as described in U.S. Pat. Nos. 3,409,579; 3,676,392; and 3,485,797, meta to the phenolic hydroxyl group, the sum of $m$ and $n$ is at least 2 and the ratio of $m$-to-$n$ is at least 1, and X is an end-group from the group consisting of hydrogen and methylol, the molar ratio of said methylol-to-hydrogen end-groups being at least 1.

The phenolic resin component of the binder composition is, as indicated above, generally employed as a solution in an organic solvent.

The second component or package of the novel binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyante, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

Although the solvent employed in combination with either the phenolic resin or the polyisocyanate or for both components does not enter to any significant degree into the reaction between the isocyanate and the phenolic resin in the presence of the curing agent, it can affect the reaction. Thus the difference in the polarity between the polyisocyanate and the phenolic resin restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents.

Aromatic solvents stated in the U.S. Pat. No. 3,409,579 to be suitable are benzene, toluene, xylene, ethylbenzene, and mixed solvents having an aromatic content of at least 90% and a boiling point range of 280° to 450°F. Suitable polar solvents are stated to be furfural, furfuryl alcohol, Cellosolve acetate, butyl Cellosolve, butyl Carbitol, diacetone alcohol and "Texanol." Isophorone ($C_9H_{14}O$) and other cyclic ketones more recently have proved to be excellent polar solvents for the resin. Unfortunately, isophorone and these other cyclic ketone solvents have an offensive odor which is carried over into the resin solutions made with them. Kerosene and other aliphatic solvents have also been used as components of the solvent system. Minor portions of releasing agents and adhesion promoters, (silane compounds) added to the solvent system have also proved useful.

SUMMARY OF THE INVENTION

It has now been discovered that the alkyl esters of phthalic acid are an excellent solvent for the resin component of the two-package system. The odor of the phthalic acid esters is not as highly detectable in comparison to isophorone. Completely unexpected, however, are improvements in the "out-of-the-box"-strength, the ultimate tensile strength, and the resistance to humidity of sand cores made with the above-described benzylic ether resin-polyisocyanate composition using o-phthalate alkyl esters rather than isophorone as a solvent for the resin composition.

Although the phthalate esters referred to herein are meant primarily to be the esters of ortho-phthalic acid, the scope of this invention includes also those dialkyl esters of other isomeric phthalate esters which are liquid at near ambient temperatures.

In one aspect, then, this invention comprises solvent combinations of liquid dialkyl phthalate esters with non-polar solvents of the prior art and with or without other polar solvents. Optionally various aliphatic solvents such as kerosene, and optionally various releasing agents and coupling agents can be included. These solvent combinations can be used as the solvent carrier for the resin component or the hardener component of a two-package resin composition, or for the liquid curing catalyst if it is added separately as a third-package component.

In another aspect, then, this invention comprises binder compositions comprising an admixture of a resin component, a hardener component, and a curing agent, any or all of these components being dissolved in a combination of liquid solvents including one or more liquid dialkyl phthalate esters. The other components of the solvent mixture can be other aromatic solvents, the polar solvents of the aforedescribed prior art, aliphatic solvents such as kerosene, and optionally various releasing agents and coupling agents. Although the bulk of this disclosure pertains to the use of dialkyl phthalate esters as part of the solvent for the resin component, as noted previously the hardener component and the liquid catalyst component can also be dissolved in a solvent mixture containing dialkyl phthalates.

The resin component of a two- or three-package binder system preferably is a non-aqueous phenolic resin which comprises a condensation product of a phenol having the general formula;

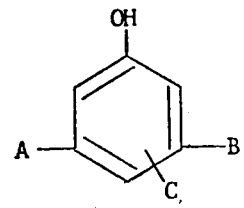

wherein A, B, and C are hydrogen, hydrocarbon radicals, oxyhydrocarbon radicals or halogen, with an aldehyde having the general forumla R'CHO wherein R' is a hydrogen or hydrocarbon radical of 1 to 8 carbon atoms. Preferably in a two- or three-package binder system the bulk of the polar solvents in the over all system is used primarily in the first or resin component package along with aromatic solvents in the prior art. The hardener component comprises liquid polyisocyanate or a solution thereof containing at least two isocyanate groups. The solvent for this latter component is either a combination of prior art solvents or can include some quantity of dialkyl phthalate ester. The curing agent is either the gaseous tertiary amine or the liquid bases of the prior art.

In another aspect, this invention comprises a foundry mix containing sand as the major constituent and a binding amount of up to 10% based on the weight of sand of the aforesaid binder composition.

In still another aspect, this invention comprises the process of preparing shaped foundry products which comprises:
a. forming a foundry mix by uniformly distributing on a foundry aggregate containing sand as the major constituent a binding amount of up to 10% based on the weight of the aggregate of the aforedescribed binder composition of phenolic resin component and hardener component polyisocyanate, said polyisocyanate being employed in a concentration of 10 to 500% by weight of the phenolic resin;
b. shaping the foundry mix in a mold; and,
c. curing the binder in said foundry mix.

The preferred weight ratio of polyisocyanate is that which is equivalent to a stoichiometric balance or equivalence between hydroxyl and isocyanate.

DETAILED DESCRIPTION OF THE INVENTION

Essentially the basis of this invention is the discovery that the use of dialkyl phthalates for at least a portion of the solvent in the benzylic ether-polyisocyanate compositions of U.S. Pat. Nos. 3,490,579 and 3,676,392 results in sand cores of improved initial (out-of-the-box) strength, in most cases increased humidity resistances, and in some cases ultimate tensile strength. This is primarily true when $R_1$ and $R_2$ (see below) average between 3 and 6 carbon atoms.

Referring to the two-package system the concentration of solvent containing dialkyl phthalate in the first component resin package will be in the range of up to 80% by weight of the resin solution and preferably in the range of 20 to 80%. The percent by weight of dialkyl phthalate in the solvent mixture can be between about 10 and about 100. It is preferred to keep the viscosity of this first component at less than X-1 on the Gardiner-Holt Scale.

The dialkyl phthalates used as a solvent in this invention preferably have the structure

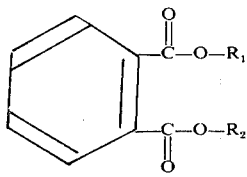

where $R_1$ and $R_2$ are alkyl radicals of 1 to 12 carbon atoms and the total number of carbon atoms in the R groups does not exceed 16. Preferably $R_1$ and $R_2$ are alkyl radicals of 3 to 6 carbon atoms and the total number of carbon atoms in $R_1$ and $R_2$ is between 6 and 12. Thus in the above structural formula, either R group can be methyl, ethyl, n-propyl, isopropyl, n-butyl, isobutyl, n-pentyl, isopentyl, hexyl, isohexyl, heptyl, isoheptyl, octyl, isooctyl, and other iosmers of the foregoing.

The second component of package of the binder composition will be the polyisocyanate composition described above in the Prior Art section. It is used in sufficient concentration to cause curing of the phenolic resin. In general, the polyisocyanate will be employed in a range of 10 to 500 weight percent based on the weight of phenolic resin. Preferably from 20 to 300 weight percent of polyisocyanate on the same basis is employed.

The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

The aggregate, e.g. sand, is usually the major constituent and the binder portion constitutes a relatively minor amount, generally less than 10%, frequently within the range of 0.25 to about 5%, these figures being based on the weight of the aggregate. Although the sand employed is preferably dry sand, moisture of up to about 1 weight percent based on the weight of the sand can be tolerated. This is particularly true if the solvent employed is non-water miscible or if an excess of the polyisocyanate necessary for curing is employed, since such excess polyisocyanate will react with the water. Some very fine sands or aggregates other than sand may require longer amounts of binder.

The binder components are combined and then admixed with sand or a similar foundry aggregate to form the foundry mix or the foundry mix can also be formed by sequentially admixing the components with the aggregate. Methods of distributing the binder on the aggregate particles are well-known to those skilled in the art. The foundry mix can, optionally, contain other ingredients such as iron oxide, ground flax fibers, wood cereals, pitch, refractory flours, and the like.

The resulting foundry mix is then molded into the desired core or shape, whereupon it can be cured. Curing is effected either by passing a tertiary amine through the molded mix as described in U.S. Pat. No. 3,409,579 or by the action of a base catalyst previously incorporated into the mix as set forth in U.S. Pat. No. 3,676,392.

A valuable additive to the binder compositions of the present invention in certain types of sand is a silane having the general formula:

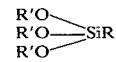

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.1 to 2% based on the phenolic binder and hardener, improves the adhesion of the phenolic binder to the foundry aggregate particle.

EXAMPLES

The present invention is further illustrated by the following examples in which all parts and percentages are by weight unless otherwise indicated. Foundry sand mixes were prepared by first admixing a commercial benzylic ether resin with dialkyl phthalates and other components as shown in Table I to make a resin component mixture for a two-package system. For comparison purposes a mixture of the same benzylic ether resin, isophorone and the same additional components were also prepared and are designated in Table I as Run No. 1. These mixtures were then blended with Port Crescent sand in the proportions shown for about 2 minutes. Next a commercial solution of isocyanate was blended into the mix for about 2 minutes. The resulting foundry sand mixes were then formed into standard AFS tensile test samples using the standard procedure. The resulting test samples were then cured by treatment with triethyl amine. In treating the samples with triethyl amine, an air stream was bubbled through the liquid triethyl amine and then passed through the test samples for a period of 5 seconds. The cured samples were then tested for tensile strength and hardness at the intervals and humidity conditions indicated in Table I.

TABLE I

| Run No. | 1 | 2 | 3 | 4 | 5 | 6 | 7 | 8 |
|---|---|---|---|---|---|---|---|---|
| RESIN COMPOSITION | | | | | | | | |
| (RESIN PACKAGE) | | | | | | | | |
| Benzylic Ether Resin | 50 | 50 | 50 | 50 | 50 | 50 | 50 | 50 |

TABLE I-continued

| Run No. | 1 | 2 | 3 | 4 | 5 | 6 | 7 | 8 |
|---|---|---|---|---|---|---|---|---|
| Aromatic Solvent | 15.5 | 17 | 15.5 | 15.5 | 15.5 | 15.5 | 15.5 | 15.5 |
| Kerosene | 3.5 | 2.0 | 3.5 | 3.5 | 3.5 | 3.5 | 3.5 | 3.5 |
| Release Agent | 1 | 1 | 1 | 1 | 1 | 1 | 1 | 1 |
| Adhesion Promoter | 0.1 | 0.1 | 0.1 | 0.1 | 0.1 | 0.1 | 0.1 | 0.1 |
| Isophorone | 30 | | | 15 | 15 | 20 | 25 | 25 |
| Dialkyl Phthalate | | | | | | | | |
| Dimethyl-phthalate | | 30 | | | | | | |
| Diethyl-phthalate | | | 30 | | | | | |
| Dibutyl-phthalate | | | | 15 | | | | 5 |
| Dioctyl phthalate | | | | | 15 | 10 | 5 | |
| FOUNDRY SAND MIX COMPOSITION | | | | | | | | |
| Port Crescent Sand | 100 | 100 | 100 | 100 | 100 | 100 | 100 | 100 |
| Polyisocyanate | 1 | 1 | 1 | 1 | 1 | 1 | 1 | 1 |
| Resin | 1 | 1 | 1 | 1 | 1 | 1 | 1 | 1 |
| Curing Conditions | | | | | | | | |
| Time gased with triethyl amine, seconds | 5 | 5 | 5 | 5 | 5 | 5 | 5 | 5 |
| Gas Purge Time, seconds | 15 | 15 | 15 | 15 | 15 | 15 | 15 | 15 |
| Tensile Strength, psi, and Scratch Hardness after Curing after | | | | | | | | |
| 1 minute ("out-of-the-box") | 97(67) | 120(65) | 148(69) | 147(71) | 153(73) | 160(67) | 155(74) | 163(74) |
| 1 hour | 235(76) | 225(73) | 202(79) | 222(81) | 253(77) | 222(77) | 210(78) | 212(76) |
| 2 hours | 230(78) | 200(80) | 235(75) | 185(74) | 247(81) | 207(78) | 212(75) | 207(76) |
| 24 hours | 218(77) | 208(77) | 230(78) | 217(78) | 244(77) | 257(76) | 220(83) | 208(84) |

In another series of tests additional tensile standard test samples were made using dibutyl phthalate and dicapryl phthalate in the weight ratios shown in Table II to make up the resin package of a two component resin binder. As in Table I, 100 parts by weight of Port Crescent sand were mixed with 1 part by weight of resin (withoutout solvent) and 1 part by weight of a standard commercial polyisocyanate to make a foundry sand mix. Table II, Run 1 is a comparison run using only isophorone instead of a phthalate in the resin package. The strength data itemized in Table II demonstrate the improved "out-of-the-box" and ultimate tensile strength obtained.

TABLE II

| Run No. | 1 | 2 | 3 | 4 | 5 |
|---|---|---|---|---|---|
| RESIN COMPOSITION (RESIN PACKAGE) | | | | | |
| Benzylic Ether Resin | 50 | 50 | 50 | 50 | 50 |
| Aromatic Solvent | 15.5 | 19 | 15.5 | 15.5 | 19 |
| Kerosene | 3.5 | 0 | 3.5 | 3.5 | 0 |
| Release Agent | 1 | 1 | 1 | 1 | 1 |
| Adhesion Promoter | 0.1 | 0.1 | 0.1 | 0.1 | 0.1 |
| Isophorone | 30 | | | | |
| Dialkyl Phthalate | | | | | |
| Dibutyl-phthalate | | 30 | 30 | 30 | |
| Dicapryl phthalate | | | | | 30 |
| FOUNDRY SAND MIX COMPOSITION | | | | | |
| Port Crescent Sand | 100 | 100 | 100 | 100 | 100 |
| Polyisocyanate | 1 | 1 | 1 | 1 | 1 |
| Resin | 1 | 1 | 1 | 1 | 1 |
| Curing Conditions | | | | | |
| Time gased with triethyl amine, seconds | 5 | 5 | 5 | 5 | 5 |
| Gase Purge Time, seconds | 15 | 15 | 15 | 15 | 15 |
| Tensile Strength, psi, and Scratch Hardness after | | | | | |
| 1 minute ("out-of-the-box") | 97(57) | 127(60) | 137(58) | 133(67) | 130(44) |
| 1 hour | 243(73) | 285(75) | 293(71) | 273(74) | 225(61) |
| 2 hours | 243(72) | 265(80) | 295(71) | 292(73) | 253(66) |
| 24 hours at 50% RH | 213(69) | 273(76) | 325(76) | 288(73) | 277(68) |
| 24 hours at 80% RH | 203(70) | 240(71) | 302(69) | 255(68) | 280(65) |
| 24 hours at 100% RH | 95(56) | 137(56) | 138(52) | 152(62) | 222(62) |

In Table III again tests almost identical to those in Tables I and II were run. Again Run I is a comparison run. In the tests at controlled humidity the samples had first been allowed to remain for 24 hours at ambient temperature and humidity and were then exposed for 8 hours to the controlled 50, 80, and 100% humidities shown in Table III. Again the improvement in tensile strength and scratch hardness are apparent. Table III also shows that mixtures of dialkyl phthalates can be used.

TABLE III

| Run No. | 1 | 2 | 3 | 4 |
|---|---|---|---|---|
| RESIN COMPOSITION (RESIN PACKAGE) | | | | |
| Benzylic Ether Resin | 50 | 50 | 50 | 50 |

TABLE III-continued

| Run No. | 1 | 2 | 3 | 4 |
|---|---|---|---|---|
| Aromatic Solvent | 15.5 | 16.5 | 16.5 | 15.5 |
| Kerosene | 3.5 | 2.5 | 2.5 | 3.5 |
| Release Agent | 1 | 1 | 1 | 1 |
| Adhesion Promoter | 0.1 | 0.1 | 0.1 | 0.1 |
| Isophorone | 30 | | | |
| Dialkyl Phthalate | | | | |
|   Dibutyl-phthalate | | 15 | 15 | |
|   Dioctyl phthalate | | 15 | | 20 |
|   Dicapryl phthalate | | | 15 | |
| FOUNDRY SAND MIX COMPOSITION | | | | |
| Port Crescent Sand | 100 | 100 | 100 | 100 |
| Polyisocyanate | 1 | 1 | 1 | 1 |
| Resin | 1 | 1 | 1 | 1 |
| Curing Conditions | | | | |
|   Time gased with triethyl amine, seconds | 5 | 5 | 5 | 5 |
|   Gas Purge Time, seconds | 15 | 15 | 15 | 15 |
| Tensile Strength, psi, and Scratch Hardness after Curing after | | | | |
|   1 minute ("out-of-the-box") | 117(60) | 142(63) | 158(62) | 163(64) |
|   1 hour | 198(72) | 315(73) | 307(76) | 305(75) |
|   2 hours | 237(73) | 298(75) | 293(76) | 325(80) |
| 24 hours at Room Temperature and ambient humidity and then after 8 hours at | | | | |
|   50% RH | 248(69) | 332(77) | 340(77) | 325(73) |
|   80% RH | 197(70) | 322(70) | 325(71) | 342(73) |
|   100% RH | 62(43) | 103(46) | 127(58) | 120(54) |

What is claimed:

1. A binder composition comprising in admixture a resin component, a hardener component, and a curing component, said resin component comprising a solution in an organic solvent comprising at least a liquid dialkyl phthalate of a non-aqueous phenolic resin which comprises a condensation product of a phenol having the general formula:

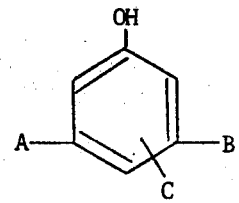

wherein A, B, and C are hydrogen, hydrocarbon radicals or halogen, with an aldehyde having the general formula R'CHO wherein R' is a hydrogen or a hydrocarbon radical of 1 to 8 carbon atoms; said hardener component comprising liquid polyisocyanate containing at least two isocyanate groups.

2. The binder composition of claim 1, wherein the aldehyde is formaldehyde.

3. The binder composition of claim 1, wherein the aldehyde is formaldehyde, and A and B are hydrogen, and C is a hydrocarbon radical.

4. The binder composition of claim 1, wherein the aldehyde is formaldehyde and A, B, and C are hydrogen.

5. The binder composition of claim 1, wherein the phenolic resin is a novolak resin.

6. The composition of claim 1 wherein the dialkyl phthalate has the following formula:

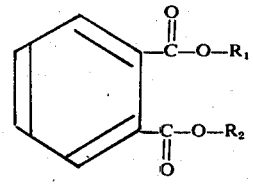

wherein $R_1$ and $R_2$ each are alkyl radicals of 1 to 12 carbon atoms and the total number of carbon atoms in $R_1$ and $R_2$ is 16 or less.

7. The composition of claim 6 wherein $R_1$ and $R_2$ each are alkyl radicals of 3 to 6 carbon atoms and the total number of carbon atoms in $R_1$ and $R_2$ is between 6 and 12.

8. The composition of claim 7 wherein the dialkyl phthalate is selected from the group consisting of dibutyl phthalate, dioctyl phthalate and dicapryl phthalate.

9. The binder composition of claim 1 wherein the phenolic resin is a novolak resin.

10. The binder composition of claim 1, wherein the phenolic resin has the general formula:

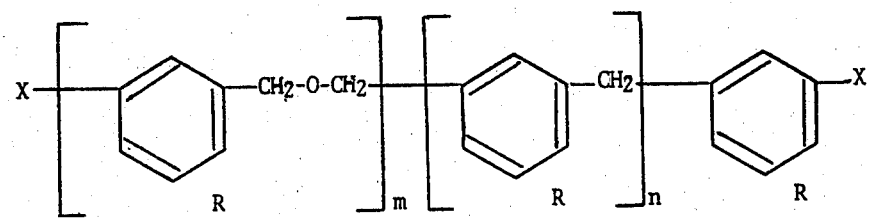

wherein R is hydrogen or a phenolic substituent meta to the hydroxyl group of the phenol, $m$ and $n$ are numbers the sum of which is at least 2, and the ratio of $m$-to-$n$ is at least 1, and X is a hydrogen or a methylol group, the molar ratio of said methylol group-to-hydrogen being at least 1.

11. The binder composition of claim 10 wherein R is hydrogen.

12. The binder composition of claim 1, wherein the polyisocyanate is an aromatic polyisocyanate.

13. The binder composition of claim 12 wherein the aromatic polyisocyanate is diphenylmethane diisocyanate.

14. The binder composition of claim 10, wherein the polyisocyanate is an aromatic polyisocyanate.

15. The binder composition of claim 10 wherein the dialkyl phthalate has the structural formula:

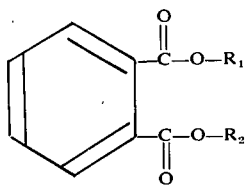

wherein $R_1$ and $R_2$ are alkyl radicals each of 1 to 12 carbon atoms and the total number of carbon atoms in $R_1$ and $R_2$ is 16 or less.

16. The binder composition of claim 15 wherein $R_1$ and $R_2$ each are alkyl radicals of 3 to 6 carbon atoms and the total number of carbon atoms in $R_1$ and $R_2$ is between 6 and 12.

17. The binder composition of claim 15 wherein $R_1$ and $R_2$ each are alkyl radicals selected from the group consisting of butyl, octyl, and capryl.

18. The binder composition of claim 15 wherein the percent by weight of dialkyl phthalate in the solvent is between about 10 and about 100.

19. The binder composition of claim 1, wherein the solvent includes at least one non-polar solvent.

20. The binder composition of claim 1, wherein the curing agent is selected from the group consisting of tertiary amines and bases the latter having a $pk_b$ value in the range of about 7 to about 11.

21. A foundry mix containing sand as the major constituent and a binding amount of up to 10% based on the weight of sand of the binder of claim 1.

22. A foundry mix containing sand as the major constituent and a binding amount of up to 10% based on the weight of sand of the binder of claim 10.

23. The process of preparing shaped foundry products which comprises:
   a. forming a foundry mix by uniformly distributing on a foundry aggregate containing sand as the major constituent a binding amount of up to 10% based on the weight of the aggregate of a binder composition obtained by combining the phenolic resin component and hardener component of claim 1, said polyisocyanate being employed in a concentration of 10 to 500% by weight of the phenolic resin;
   b. shaping the foundry mix in a mold; and,
   c. curing the shaped foundry mix with a catalyst selected from the group consisting of gaseous tertiary amines and liquid bases.

24. The process of claim 23, wherein the resin component of the binder is the phenolic resin of claim 10.

25. The process of claim 24, wherein the polyisocyanate is an aromatic polyisocyanate.

26. The process of claim 23 wherein the foundry mix is prepared by admixing the foundry aggregate with the phenolic resin component and thereafter admixing the resulting mixture with the hardener component.

* * * * *